US011455885B2

(12) United States Patent
Geiselhart et al.

(10) Patent No.: US 11,455,885 B2
(45) Date of Patent: Sep. 27, 2022

(54) CONSENSUS-BASED MONITORING OF DRIVING BEHAVIOR IN CONNECTED VEHICLE SYSTEMS

(71) Applicant: International Business Machines Corporation, Armonk, NY (US)

(72) Inventors: Reinhold Geiselhart, Rottenburg-Ergenzingen (DE); Felix Beier, Haigerloch (DE); Dominik Schnell, Großenlüder (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 270 days.

(21) Appl. No.: 16/692,738

(22) Filed: Nov. 22, 2019

(65) Prior Publication Data

US 2021/0158691 A1    May 27, 2021

(51) Int. Cl.
| | |
|---|---|
| *G08B 21/00* | (2006.01) |
| *G08G 1/01* | (2006.01) |
| *B60Q 9/00* | (2006.01) |
| *G08G 1/0962* | (2006.01) |

(Continued)

(52) U.S. Cl.
CPC ............ *G08G 1/0112* (2013.01); *B60Q 9/00* (2013.01); *G08G 1/0962* (2013.01);
(Continued)

(58) Field of Classification Search
CPC .... G08G 1/0112; G08G 1/0962; G08G 1/161; G08G 1/166; B60Q 9/00; H04W 84/18;
(Continued)

(56) References Cited

U.S. PATENT DOCUMENTS

| | | | |
|---|---|---|---|
| 8,880,282 B2 | 11/2014 | Gunaratne | |
| 2010/0214085 A1* | 8/2010 | Avery | G08G 1/161 |
| | | | 340/435 |

(Continued)

FOREIGN PATENT DOCUMENTS

| | | |
|---|---|---|
| CN | 104715627 A | 6/2015 |
| CN | 106683464 A | 5/2017 |

(Continued)

OTHER PUBLICATIONS

Patent Cooperation Treaty, PCT/IB2020/060865, Feb. 25, 2021.

*Primary Examiner* — Mark S Rushing
(74) *Attorney, Agent, or Firm* — Garg Law Firm, PLLC; Rakesh Garg; Christopher Pignato (57) ABSTRACT

A method for vehicle traffic behavior monitoring and feedback that includes collecting vehicle sensor data from a set of vehicles operating in a traffic environment, where each vehicle transmits vehicle sensor data via a communications network to a processor, and forming a consensus block of aggregate data, where the aggregate data is made of individual vehicle sensor data from each vehicle in the set of vehicles, and where the processor discards duplicate data and repetitive data from the consensus block. The method also includes detecting, in the consensus block, a vehicle motion pattern, where the vehicle motion pattern deviates from a threshold by greater than a tolerance, mapping the vehicle motion pattern to a particular vehicle in the set of vehicles, and generating a feedback response based on the mapping.

20 Claims, 7 Drawing Sheets

(51) Int. Cl.
*H04W 84/18* (2009.01)
*G06Q 50/26* (2012.01)
*G05D 1/02* (2020.01)

(52) U.S. Cl.
CPC ......... *G05D 1/0276* (2013.01); *G06Q 50/265* (2013.01); *H04W 84/18* (2013.01)

(58) Field of Classification Search
CPC . H04W 84/005; G06Q 50/265; G05D 1/0276; G06F 17/30138; G06F 11/1464; G06F 11/1471; G06F 17/30156; G06F 17/30215
USPC .......................................... 340/438; 701/117
See application file for complete search history.

(56) References Cited

U.S. PATENT DOCUMENTS

| | | | | |
|---|---|---|---|---|
| 2011/0025527 | A1* | 2/2011 | Chandra | G08G 1/161 340/902 |
| 2015/0146605 | A1 | 5/2015 | Rubin et al. | |
| 2015/0170522 | A1* | 6/2015 | Noh | G08G 1/096791 701/117 |
| 2016/0280370 | A1* | 9/2016 | Canavor | G05D 1/104 |
| 2017/0025012 | A1* | 1/2017 | Thompson | G08G 1/166 |
| 2017/0053461 | A1* | 2/2017 | Pal | H04W 4/027 |
| 2017/0132922 | A1* | 5/2017 | Gupta | G08G 1/04 |
| 2018/0197416 | A1 | 7/2018 | Hyde et al. | |
| 2018/0204459 | A1* | 7/2018 | Bradley | G08G 1/164 |
| 2019/0051188 | A1* | 2/2019 | Moustafa | G05D 1/0291 |
| 2019/0287200 | A1* | 9/2019 | Schuler | G06Q 50/265 |

FOREIGN PATENT DOCUMENTS

| | | |
|---|---|---|
| CN | 108140310 A | 6/2018 |
| CN | 108446992 A | 8/2018 |
| CN | 110574089 A | 12/2019 |
| JP | 2019028549 A | 2/2019 |

* cited by examiner

CONSENSUS-BASED MONITORING OF DRIVING BEHAVIOR IN CONNECTED VEHICLE SYSTEMS

TECHNICAL FIELD

The present invention relates generally to a method, computer program product, and system in the field of vehicle traffic behavior. More particularly, the present invention relates to a method, computer program product, and system for consensus-based monitoring of driving behavior in connected vehicle systems.

BACKGROUND

Vehicle traffic accidents incur a heavy cost in lives and property damage worldwide. An analysis of traffic accidents discloses several patterns. In many instances, accidents are caused by distracted drivers or drivers unaware of local road conditions. Additionally, regions with unsophisticated or weak traffic controls show a greater likelihood for having more accidents. In addition to automobile accidents, vehicle accidents also occur with ships and water vessels on waterways, between aircraft and service vehicles on airport taxiways, between two aircraft on the ground, and between people while driving motorized scooters and personal transportation devices.

Modern personal vehicles, including automobiles, already come equipped with a variety of sensors, including but not limited to motion sensors, still cameras, event recorders, video cameras, proximity detectors, lane detectors, speed sensors, rain sensors, turn signal sensors, and the like. As vehicle technology evolves, it is likely that individual vehicles will use more sensors to include video sensors and sensors that are used in maintaining speed and spacing within a travel lane. Furthermore, the emergence of autonomous vehicles is also closely aligned with vehicles having a multitude of motion, proximity, and status sensors.

Modern vehicles today use a variety of sensors to monitor and report on vehicle status and also on vehicle motion, with the vehicle reporting, or sending feedback back to the individual driver. The feedback can include mechanical status of the vehicle, or can include proximity alerts, excessive speed alerts, pedestrians in the path of travel, and the like. Personal vehicles, such as automobiles, also employ diagnostic and driving-aid sensors and systems. In one example, several commercially-available vehicles currently available today use an automatic-brake system and a localized proximity sensor to prevent or minimize collisions with a vehicle in front of the traveling vehicle. When activated, the automatic-brake system applies the brakes and makes an effort to stop the vehicle before hitting an object. In another example, some automobiles can disable the engine when a mechanical fault is detected to prevent mechanical damage. In some vehicles, a sensor system can aid in parallel parking, lane following, variable-speed cruise control, and the ability to detect a driver that is falling asleep. Some vehicles can also provide autonomous feedback in response to sensor data, such as automatic braking of the vehicle without driver input, automatic steering of the vehicle during parking efforts, and automatic steering to maintain lane spacing.

It is also apparent that public thoroughfares such as roads and airports are using more and more video cameras as part of an effort to improve safety, security, and to record events of interest to interested parties such as governments, first responders, and traffic monitoring organizations. The result is roadways that are monitored by a variety of sensors and cameras.

Current technology allows for an individual vehicle to receive and respond to events due to that vehicle's sensor data. However, in the present driving environment, there lacks a community-based or consensus-based driver's aid method and system where a vehicle traveling in a common environment with other vehicles uses all of the sensors currently in the proximity to that vehicle, to include the vehicle itself, nearby vehicles, and external sensors such as traffic cameras and security cameras on buildings. A vehicle that uses multiple inherent and external sensors is said to use a consensus of available sensor data.

In the current driving environment, a vehicle travels in sensor range of a variety of sensors, many of which are unavailable to a specific vehicle. Therefore, while many different types of sensor data are generated while a vehicle travels through a common environment, this sensor data is not currently used. This collection of available data is termed "consensus-based data" and represents the sum of data collected from multiple sensors monitoring a roadway, ship channel, and the like. Each sensor supplying data to the consensus-based data reports on events that occur from that sensor's individual point of view. A consensus-based data block is thus a collection of data from many individual sensors to provide an unbiased image of events that occur in view of several independent sensors.

In the present environment, individual driving behavior sometimes contributes to accidents, causing injuries to people and damage to property. Drivers, pilots, ship captains, and the like are often distracted by a myriad of data flowing to them, by distractions from cell phones, external sounds, weather events, road conditions, and by fatigue or the presence of substances that enhance or hinder the responses of the driver to evolving driving conditions. It is likely that distractions to drivers will increase as technology continue to evolve, vehicles become more complex, and thoroughfares become more crowded. In addition, some drivers sometimes decide to not behave in a defensive way (by adhering to the rules) intentionally, but choose a more aggressive driving behaviors instead in order to gain particular advantages, such as traveling faster, saving time, or avoiding stops and delays. This disclosure can help save lives of other traffic drivers and pedestrians by warning them about the detected inappropriate behavior and also by having a positive effect on the misbehaving driver by providing immediate personal feedback. In another example, autonomous cars could potentially fail to adhere to driving rules due to programming errors. Unbiased external sensor feedback can be helpful to fix such programming issues.

One evolving trend with personal vehicles is the ability to connect wirelessly with local cell towers, satellite service, and wireless networks originating from vehicles themselves. Some personal devices such as cell phones, laptops, and tablets can also act as a wireless access point. Therefore, in many instances, a vehicle driving down a road is often exposed to a variety of options to connect wirelessly with the internet, the cloud, and the like.

In many cases, accidents are caused by local conditions a vehicle driver is unaware of, such as stalled traffic, pedestrians in the roadway, construction sites, an accident around a curve, and the like. However, it is possible that other vehicle's sensors and/or stationary cameras and other sensors have already detected the condition, but are currently unable to alert emerging drivers of the danger.

SUMMARY

The illustrative embodiments provide a method for vehicle traffic behavior and feedback that includes collecting vehicle sensor data from a set of vehicles operating in a traffic environment, where each vehicle transmits vehicle sensor data via a communications network to a processor, and forming a consensus block of aggregate data, where the aggregate data is made of individual vehicle sensor data from each vehicle in the set of vehicles, and where the processor discards duplicate data and repetitive data from the consensus block. The method also includes detecting, in the consensus block, a vehicle motion pattern, where the vehicle motion pattern deviates from a threshold by greater than a tolerance, mapping the vehicle motion pattern to a particular vehicle in the set of vehicles, and generating a feedback response based on the mapping.

An embodiment includes a computer program product for vehicle traffic behavior monitoring and feedback, the computer program product that includes one or more computer readable storage media and program instructions collectively stored on the one or more computer readable storage media, the program instructions that includes program instructions to collect vehicle sensor data from a set of vehicles operating in a traffic environment, where each vehicle transmits vehicle sensor data via a communications network to a processor, and program instructions to form a consensus block of aggregate data, where the aggregate data comprises individual vehicle sensor data from each vehicle in the set of vehicles, and where the processor discards duplicate data and repetitive data from the consensus block. The program instructions also include program instructions to detect, in the consensus block, a vehicle motion pattern, where the vehicle motion pattern deviates from a threshold by greater than a tolerance, program instructions to map the vehicle motion pattern to a particular vehicle in the set of vehicles, and program instructions to generate a feedback response based on the mapping.

An embodiment includes a computer system that includes a processor, a computer-readable memory, a computer-readable storage device, and program instructions stored on the storage device for execution by the processor via the memory, the stored program instructions that includes program instructions to collect vehicle sensor data from a set of vehicles operating in a traffic environment, where each vehicle transmits vehicle sensor data via a communications network to a processor, and program instructions to form a consensus block of aggregate data, where the aggregate data comprises individual vehicle sensor data from each vehicle in the set of vehicles, and where the processor discards duplicate data and repetitive data from the consensus block. The program instructions also include program instructions to detect, in the consensus block, a vehicle motion pattern, where the vehicle motion pattern deviates from a threshold by greater than a tolerance, program instructions to map the vehicle motion pattern to a particular vehicle in the set of vehicles, and program instructions to generate a feedback response based on the mapping.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments recognize that there is a need for consensus-based monitoring of driving behavior in connected vehicle systems, to include personal vehicles, commercial vehicles, aircraft, ships and other vessels, and transportation devices of all types.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
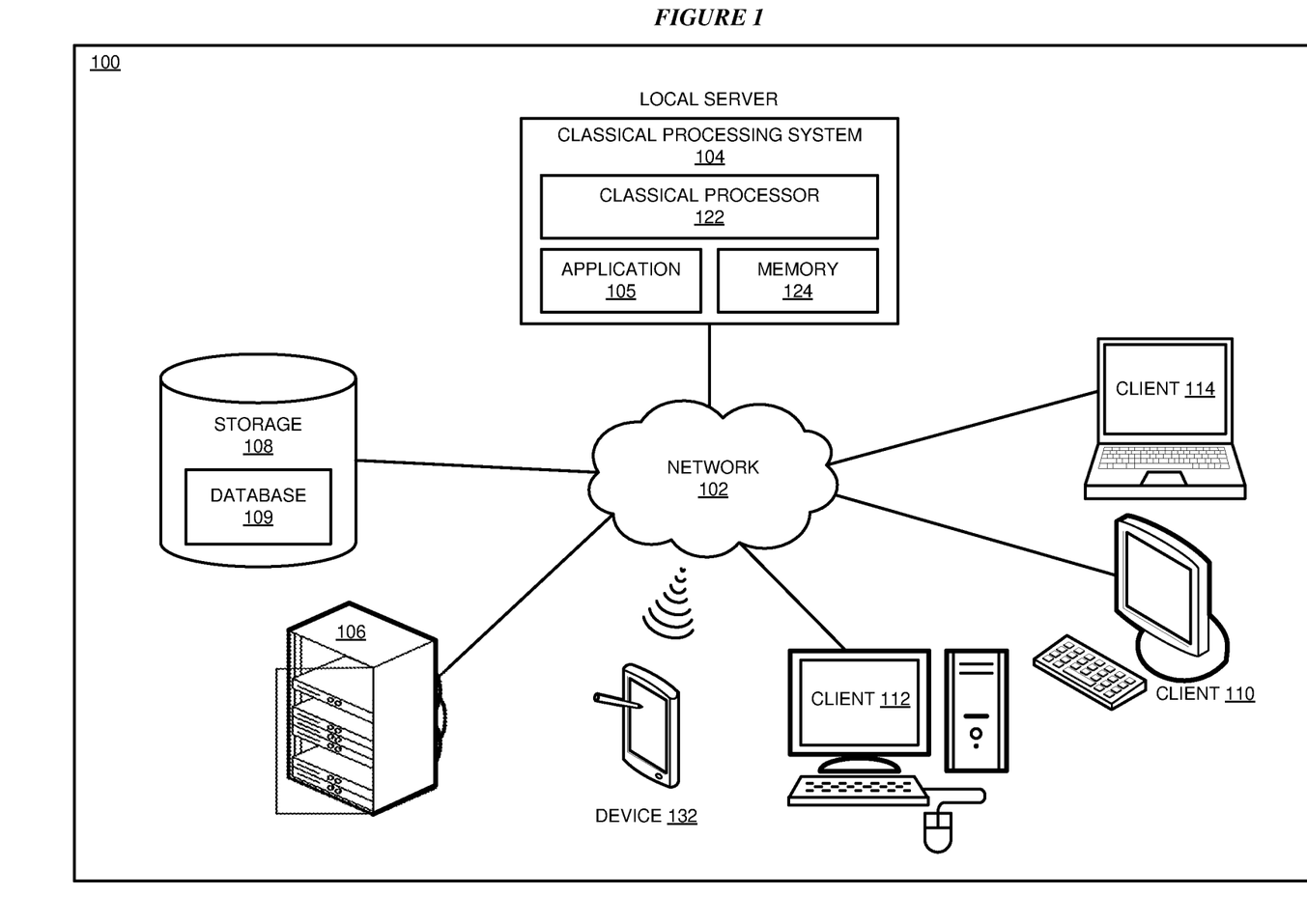
FIG. 1 depicts a block diagram of a network of data processing systems in which illustrative embodiments may be implemented.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Servers 104 and 106, storage unit 108, and clients 110, 112, and 114, and device 132 may couple to network 102 using wired connections, wireless communication protocols, or other suitable data connectivity. Clients 110, 112 and 114 may be, for example, personal computers or network computers. Application 105 implements an embodiment described herein.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

Figure 2:
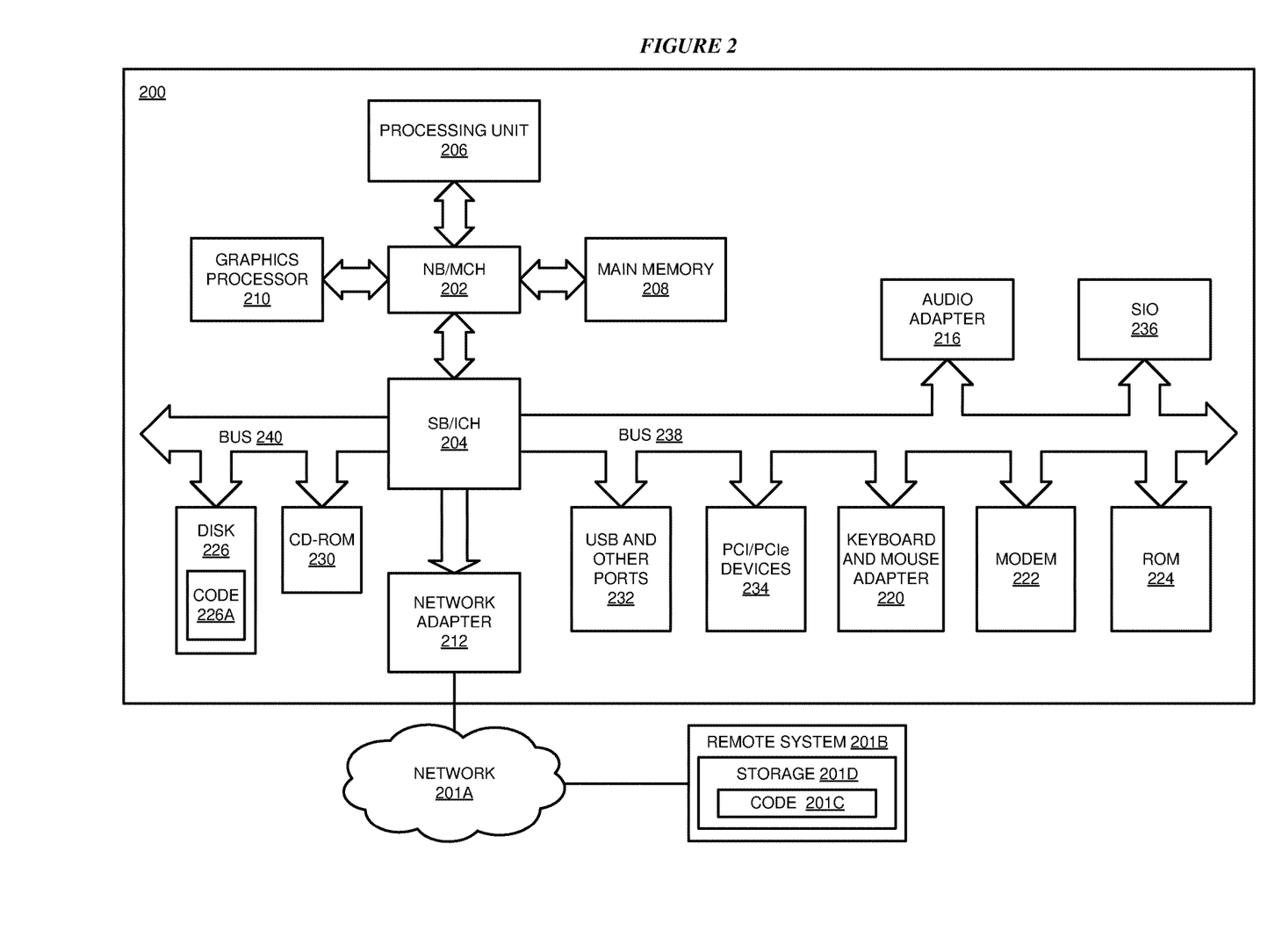
FIG. 2 depicts a block diagram of a data processing system in which illustrative embodiments may be implemented.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as classical processing system 104 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An artifact oriented or other type of programming system may operate in conjunction with the operating system and provide calls to the operating system from programs or applications executing on data processing system 200.

Instructions for the operating system, the artifact-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
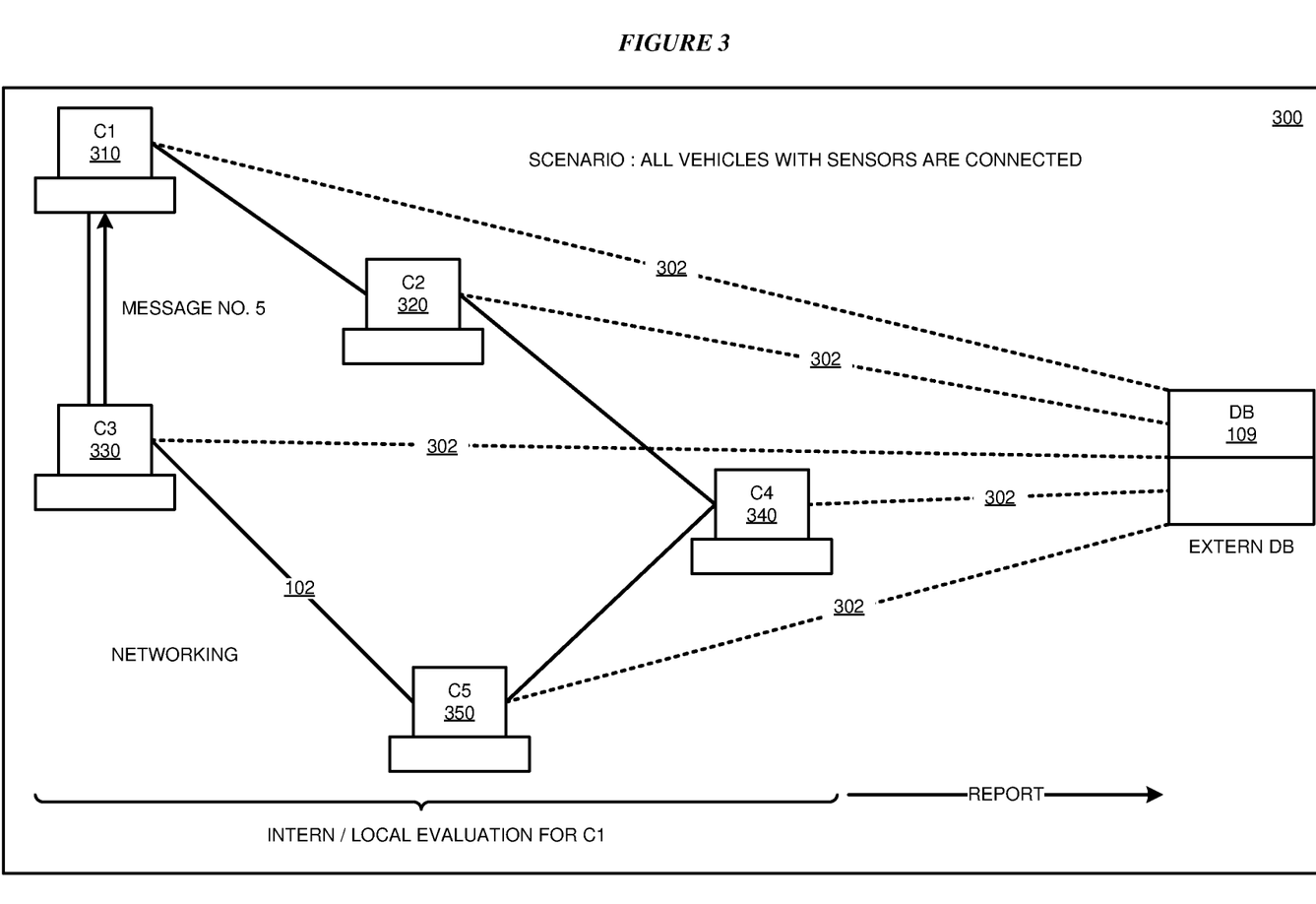
FIG. 3 depicts a functional diagram of a group of vehicles in a common environment with each vehicle sending motion data to a computer network in accordance with an illustrative embodiment.

With reference to FIG. 3, this figure depicts a functional diagram of a group of vehicles 310, 320, 330, 340, 350 (labeled C1-C5 respectfully) in a first common environment 300 with each vehicle sending motion data 302 via a computer network 102 to a database, such as database 109 of FIG. 1, in accordance with an illustrative embodiment. In first common environment 300, each of the vehicles 310, 320, 330, 340, 350 has inherent sensors onboard that report on the mechanical status and motion as that vehicle travels down a roadway. As the vehicle 310, 320, 330, 340, 350 travels along the first common environment 300, sensors in each vehicle collects and transmits motion and status data through a communications network, such as wireless network 102 of FIG. 1, where the sensor data is stored in the database 109. A central processor, such as processor system 104 (processor) collects, stores, and collates the sensor data 302 from each vehicle 310, 320, 330, 340, 350 to form a collection of data, or aggregated data, which is called a "consensus block" of data. The processor 104 then detects vehicle motion patterns in the consensus data that exceeds a given threshold, indicating a vehicle that has potentially started a high-risk maneuver or otherwise has exhibited behavior that is inconsistent with established driving safety guidelines.

In an effort to avoid false positive results being stored in the consensus block, and also to establish high reliability and consistency in the data itself, a minimum number (quorum) of vehicles 310, 320, 330, 340, 350 with onboard sensors need to be present in the first common environment 300. The quorum of vehicles can vary in a given situation. In one example, a quorum of five vehicles is required, while in another example, a quorum of three vehicles is sufficient to establish redundancy and reliability in the data stored in the consensus block. According to some embodiments, one vehicle 310 in the common environment is of interest to a monitoring authority, with the other vehicles 320, 330, 340, 350 acing as witnesses to the driving behavior of vehicle 310. In FIG. 3, there is a quorum of three vehicles, with five vehicles present. In a situation where a quorum is not reached (e.g., there are too few vehicles in the first common environment 300), the consensus block is not updated as the data sent by each vehicle 310, 320, 330, 340, 350 cannot be verified to a satisfactory level.

According to some embodiments, external sensors not located aboard a vehicle 310, 320, 330, 340, 350 can also submit sensor data 302 to the database 109, with external sensors defined as sensors not included in the quorum of vehicles in the first common environment 300. External sensors can include, but are not limited to video cameras located in mobile or immobile vehicles (not in the quorum), traffic cameras, video and audio from smartphones, drone sensors, security cameras mounted on structures, toll booth sensors, and the like. Other sensors are possible and are not limited by these examples. According to some embodiments, sensor data from external sensors can also be sent to the database 109 for inclusion into the consensus block as described herein.

According to some embodiments, each quorum of vehicles, and each external sensor in the first common environment 300 sends their sensor data to the database 109 via an ad-hoc wireless network, such as network 102 of FIG. 1. The range of elements within the ad-hoc network 102 does not need to be large, as a range sufficient to cover a normal traffic situation would be adequate. Some example traffic situations can include, but are not limited to heavy traffic conditions, passing cars across lines, speeding, and the like.

According to some embodiments, each vehicle 310, 320, 330, 340, 350 shares sensor data with each other vehicle 310, 320, 330, 340, 350 via the ad-hoc network 102. In this manner, an objective view of events in time can be collected and sent to the database 109 to form an impartial consensus block for later analysis. It is possible that each vehicle 310, 320, 330, 340, 350 in the quorum sensing slightly different versions of the same event, thus providing a unique perspective from each vehicle 310, 320, 330, 340, 350 as seen by that's vehicle's point of view. Thus combined, only the aggregated data that makes up the consensus block is used for further analysis and potential action by a monitoring authority. In some embodiments, vehicle motion that is greater than a tolerance for a given threshold leads to the processor 104 to map the identity of the vehicle to a specific vehicle (mapping). According to some embodiments, the monitoring authority monitors the consensus block and determines when vehicle motion that is greater than a given tolerance exceeds a threshold value, thus triggering a feedback (response), where the response is a positive response or a negative response.

In one embodiment, a responsible party or monitoring authority, such as law enforcement or a traffic flow monitoring authority, analyzes the consensus block for improper driving behavior. Once undesirable driving behavior is detected, the processor 104 can make a decision to generate a feedback action. Feedback actions include both positive feedback and negative feedback. Positive feedback includes, but is not limited to rendering aid to the driver in the form of sending a message to the vehicle driver via the sound system, cell phone communications, vibration through the vehicle, and the like. Negative feedback includes, but is not limited to restricting vehicle motion through the use of brakes or hindering engine output, correcting for steering errors, or notifying a monitoring authority for assistance in an effort to give the driver aid and assistance when needed to ensure the first common environment 300 is safe.

In some embodiments, the consensus block of sensor data is sent to an external authority, where the external authority filters the incoming consensus blocks, discards duplicate data, and updates the remaining block into an overall blockchain, thus preserving the consensus block in an immutable database to be used as evidence in any further proceedings. The consensus block thus contains all necessary information related to a given driving condition at a first common environment 300 at a given time period.

Figure 4:
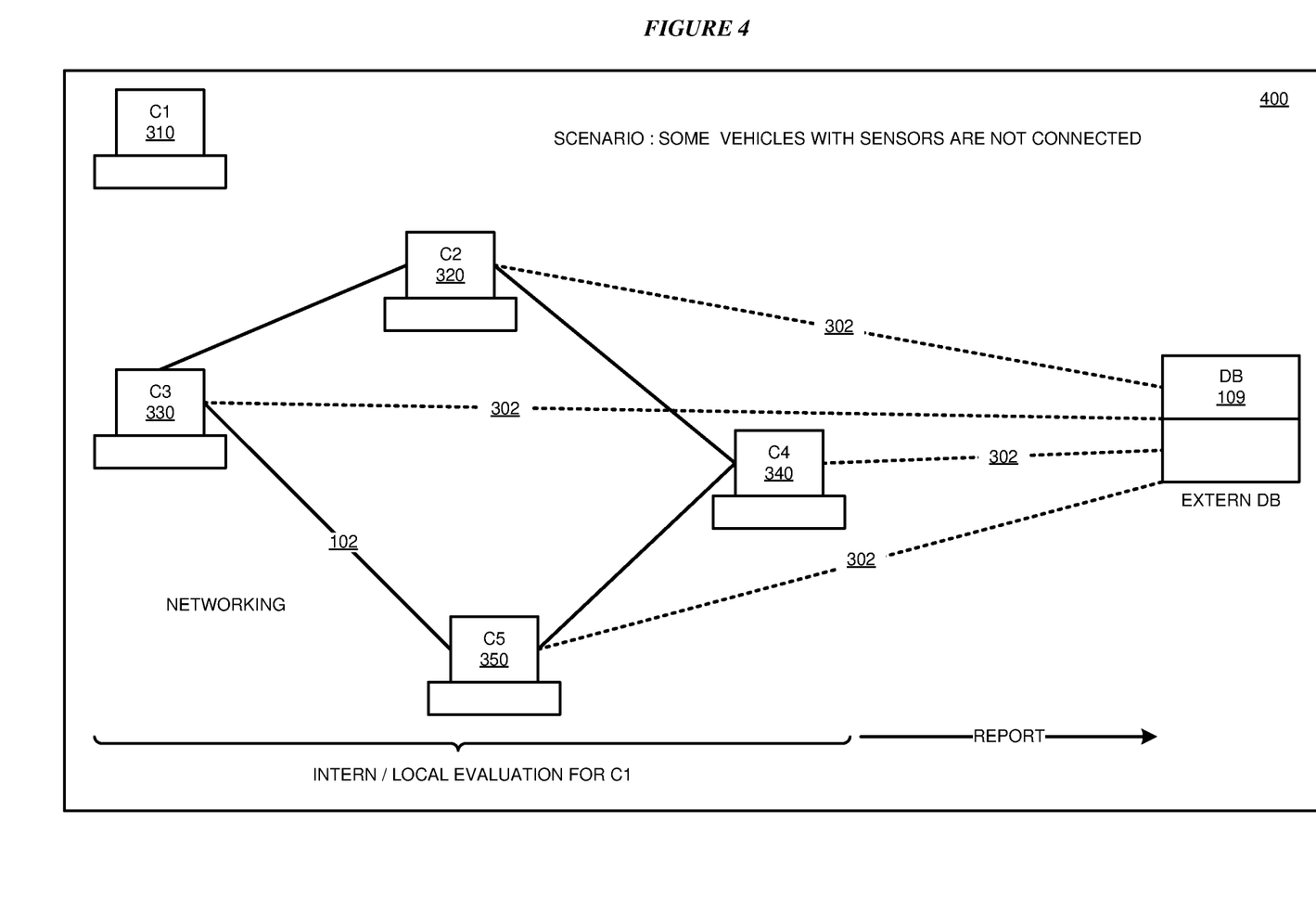
FIG. 4 depicts a functional diagram of a group of vehicles in a common environment with some vehicles sending motion data and some vehicles not connected to a computer network in accordance with an illustrative embodiment.

With reference to FIG. 4, this figure depicts a functional diagram of a group of vehicles 310, 320, 330, 340, 350 in a second common environment 400 with some vehicles 320, 330, 340, 350 sending motion data and a vehicle 310 not connected to a computer network 102 in accordance with an illustrative embodiment. Second common environment 400 is similar to the first common environment 300 except that there is one vehicle 310 that is not connected to the ad-hoc network 102. However, as there are 4 other vehicles 320, 330, 340, 350 present, a quorum is still established and sensor data collection is possible. Therefore, each connected vehicle 320, 330, 340, 350 continues to send sensor data 302 to the database 109 and a consensus block of sensor data is formed and stored. In this embodiment, vehicle 310 can still be monitored while within the second common environment 400 but cannot send or receive sensor data or feedback of any kind, either positive or negative.

Examples of driving behaviors that either generate no feedback response or a positive feedback response include keeping a safe distance following other vehicles, using turn signals, allowing other cars to merge, staying out of restricted lanes, and giving pedestrians the right-of-way. Examples of driving behavior that generates a negative response includes violating safe following distances, passing a car illegally, causing abrupt braking from nearby vehicles, not using the turn signal when changing lanes, not yielding the right-of-way to pedestrians, and the like. Other examples are possible and are not limited by these examples.

Figure 5:
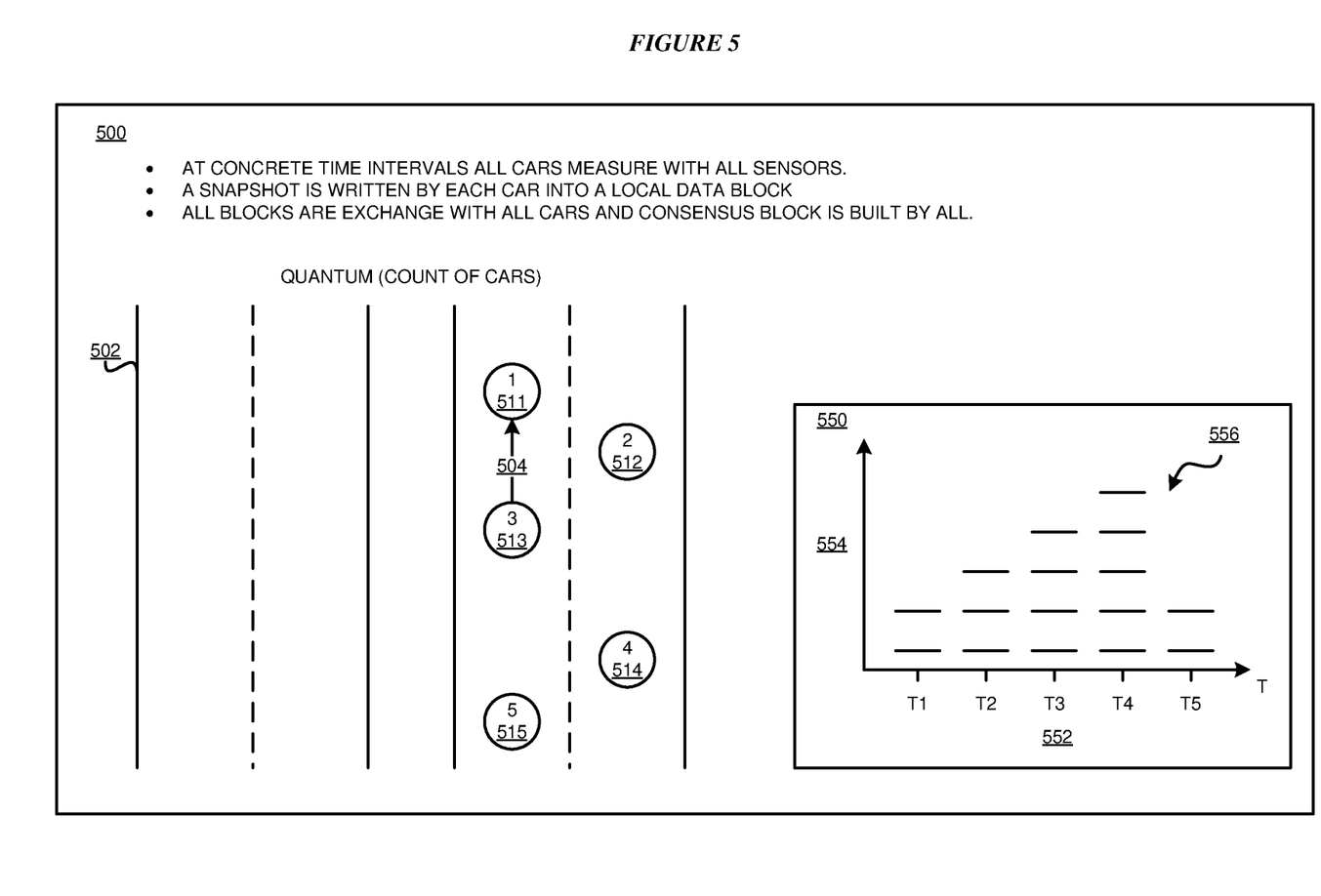
FIG. 5 depicts a functional diagram where a group of vehicles being monitored by a computer network for traffic-related behavior in accordance with an illustrative embodiment.

With reference to FIG. 5, this figure depicts a functional diagram where a group of vehicles 511, 512, 513, 514, 515 (labeled 1-5) being monitored by a computer network for traffic-related behavior starts a feedback event 500 in accordance with an illustrative embodiment. The group of vehicles 511, 512, 513, 514, 515 form a quorum of vehicles and are being monitored by both internal vehicle sensors and traffic sensors as parts of the roadway 502 monitoring system. In the present embodiment, the quorum sends vehicle motion data 302 to the database 109 as disclosed herein. Once the consensus block is formed from the aggregate data, elements 504 of the consensus block is sent back via the computer network 102 to be shared with each vehicle 511, 512, 513, 514, 515. In this manner, all elements 504 of the consensus block are shared by each vehicle 511, 512, 513, 514, 515, and the consensus block is constructed using viable data from each of the vehicles 511, 512, 513, 514, 515 to form a reliable and objective snapshot of the conditions on the roadway 502 at during a given time period.

Continuing with FIG. 5, a quorum histogram chart 550 is disclosed showing the total count of vehicles on the y-axis 554 and time displayed on the x-axis 552. The resultant graph 556 discloses two vehicles in the quorum at time T1, three vehicles present in the quorum at time T2, etc. Therefore, using the examples previously discussed, a quorum of vehicles was not present at times T1 and T5 but were present at times T2-T4. In FIG. 5, the example continues with vehicle 513 accelerating towards the rear of vehicle 511. Each vehicle 511, 512, 513, 514, 515 in the quorum reports this sensor data, as gathered from each vehicle's unique point-of-view, and sends the data to the database 109 to augment the consensus block. Once the processor at the traffic control monitoring authority detects that vehicle 513 is in danger of hitting vehicle 511, a feedback response is generated and sent to vehicle 513. The feedback as disclosed earlier can be positive or negative. The feedback responses for this example can include, but is not limited to alerting the driver of vehicle 513 using audible or visible signals, commanding the vehicle to apply its brakes, or alerting local first responders of erratic driving behavior emanating from vehicle 513. Other response, or a combination of positive and negative feedback responses are possible and are not limited by this example.

Figure 6:
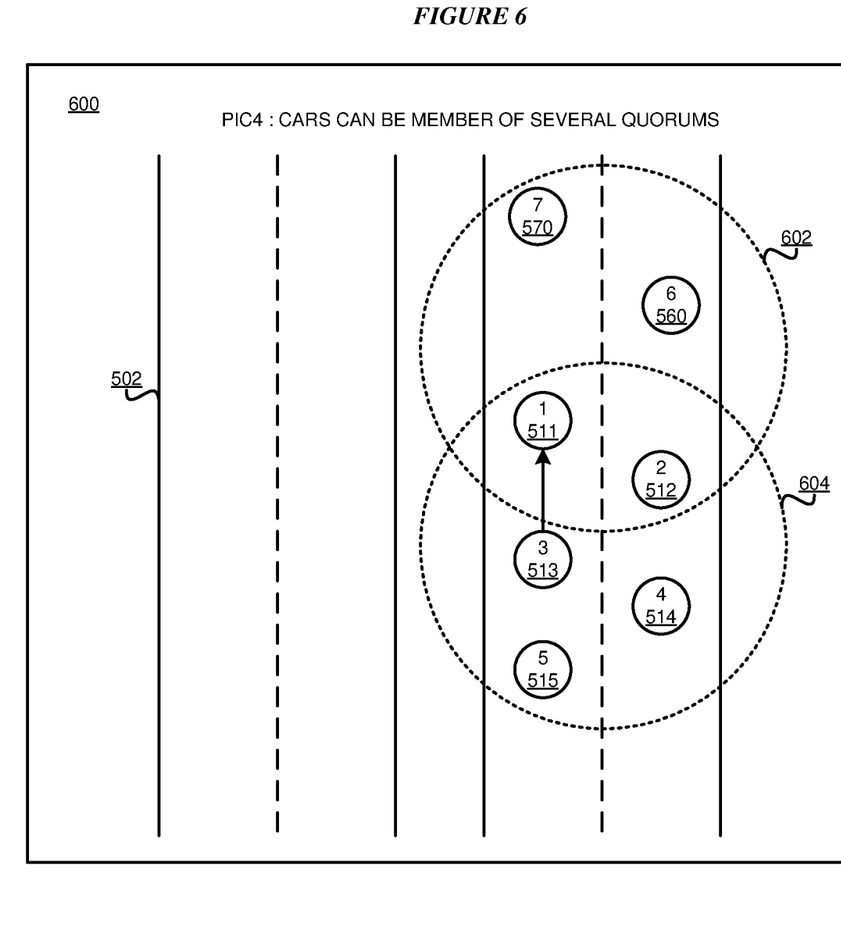
FIG. 6 depicts a functional diagram where a group of vehicles traveling in a common environment can be a member of several groups simultaneously in accordance with an illustrative embodiment.

With reference to FIG. 6, this figure depicts a functional diagram where several groups of vehicles 511, 512, 513, 514, 515, 560, 570 (labeled 1-7) being monitored by a computer network for traffic-related behavior starts a feedback event 600. In this embodiment, it is demonstrated that within a single group of vehicles 511, 512, 513, 514, 515, 560, 570, several different quorums can be defined simultaneously. In this embodiment, a first quorum 602 can be defined, for example, as the first three vehicles pulling away from a traffic light, while a second quorum 604 can be defined as those vehicles 511, 512, 513, 514, 515, 560, 570 that are driving below the posted speed limit. Regardless of the participation of each vehicle 511, 512, 513, 514, 515, 560, 570 in a given quorum, each vehicle's sensor data can be sent via the ad-hoc network 102 to the database to update the consensus block as disclosed herein.

Figure 7:
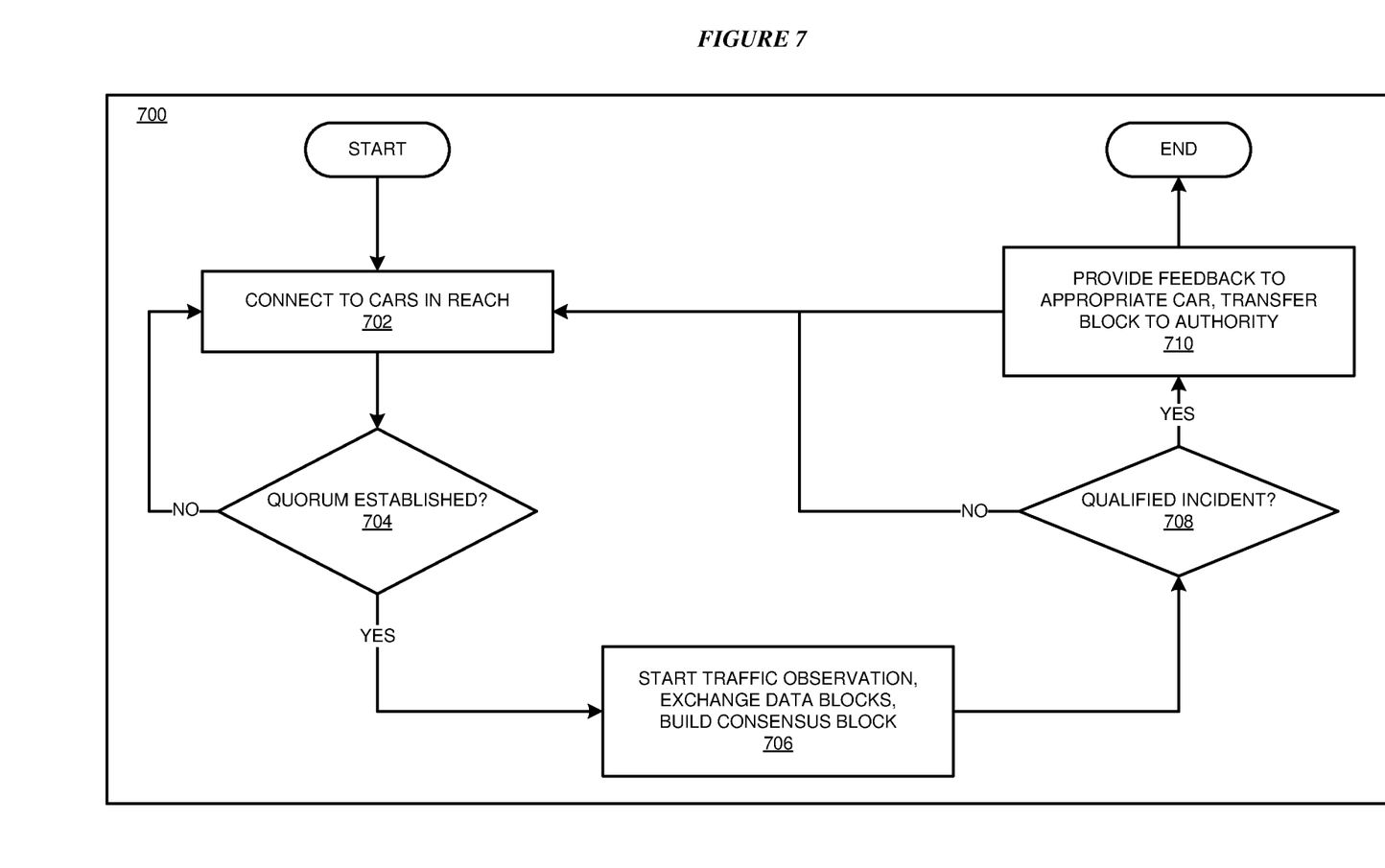
FIG. 7 depicts a flowchart of an example process for monitoring a group of vehicles traveling in a common environment for traffic-related behavior in accordance with an illustrative embodiment.

With reference to FIG. 7, this figure depicts a flowchart of an example process 700 for monitoring several groups of vehicles traveling in a common environment for traffic-related behavior in accordance with an illustrative embodiment. Process 700 begins at block 702 where a quorum of vehicles within a common environment are within a given ad-hoc wireless network, such as network 102 as disclosed herein. Next, at decision block 704, the processor determines whether a quorum is present. A minimum number of vehicles must be present in order to form a quorum. Additionally, a given vehicle can be a member of more than one quorum simultaneously. If the answer at decision block is "No", the process returns to await additional vehicles. If the answer is "Yes", the process continues at block 706, where vehicle sensors and external sensors send data to the database, such as database 109 to form a consensus block of aggregated data. As the consensus block is formed, the consensus block is shared with each connected vehicle to ensure all vehicles have access to the same data. Next, at decision block 708, the processor analyzes the consensus block to detect whether aberrant driving behavior has been detected in one of the vehicles in the quorum. If "No", the process 700 returns to form an additional quorum of vehicles at block 702. If "Yes", the processor generates a response feedback action, either positive or negative, and sends the response back to the vehicle, another authority, or to first responders for further action.

Thus, a computer implemented method, computer program product, and system are provided in the illustrative embodiments for consensus-based monitoring of driving behavior in connected vehicle systems and other related features, functions, or operations. Where an embodiment or a portion thereof is described with respect to a type of device, the computer implemented method, computer implemented program product, or system, or a portion thereof, are adapted or configured for use with a suitable and comparable manifestation of that type of device.

Where an embodiment is described as implemented in an application, the delivery of the application in a "Software as a Service" (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or artifact code written in any combination of one or more programming languages, including an artifact oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products for consensus-based monitoring of driving behavior in connected vehicle systems according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for vehicle traffic behavior monitoring and feedback, comprising:
   collecting vehicle sensor data from a set of vehicles operating in a traffic environment, wherein each vehicle transmits vehicle sensor data via a communications network to a processor;
   determining whether to analyze the vehicle sensor data by determining whether the set of vehicles includes enough vehicles to form a quorum;
   forming, responsive to determining that the set of vehicles forms a quorum, a consensus block of aggregate data, wherein the aggregate data comprises individual vehicle sensor data from each vehicle in the set of vehicles, and wherein the processor discards duplicate data and repetitive data from the consensus block;
   detecting, in the consensus block, a vehicle motion pattern, wherein the vehicle motion pattern deviates from a threshold by greater than a tolerance;
   mapping the vehicle motion pattern to a particular vehicle in the set of vehicles; and
   generating a feedback response based on the mapping.

2. The method of claim 1, further comprising:
   updating the consensus block with data from non-vehicular sensors.

3. The method of claim 1, wherein the consensus block is stored as immutable data in a block-chain database.

4. The method of claim 1, wherein the feedback response comprises alerting a driver in the mapped vehicle.

5. The method of claim 1, wherein the feedback response comprises alerting first response personnel.

6. The method of claim 1, wherein the feedback response comprises alerting drivers of other vehicles in the set of vehicles.

7. The method of claim 1, wherein the feedback response comprises commanding the mapped vehicle to perform an action.

8. The method of claim 1, further comprising:
   sending the consensus block to an external authority.

9. The method of claim 1, wherein at least one of the vehicles in the set of vehicles is autonomously-controlled.

10. The method of claim 1, wherein the set of vehicles comprises at least one of road vehicles, aircraft, ships, trains, and pedestrians operating personal-movement devices.

11. The method of claim 1, further comprising:
    transmitting, by the processor, the consensus block to all vehicles of the set of vehicles.

12. A computer program product for vehicle traffic behavior monitoring and feedback, the computer program product comprising:
    one or more computer readable storage media; and
    program instructions executable by a processor and collectively stored on the one or more computer readable storage media, the program instructions comprising:
    program instructions to collect vehicle sensor data from a set of vehicles operating in a traffic environment, wherein each vehicle transmits vehicle sensor data via a communications network to a processor;
    program instructions to determine whether to analyze the vehicle sensor data by determining whether the set of vehicles includes enough vehicles to form a quorum;

program instructions to form, responsive to determining that the set of vehicles forms a quorum, a consensus block of aggregate data, wherein the aggregate data comprises individual vehicle sensor data from each vehicle in the set of vehicles, and wherein the processor discards duplicate data and repetitive data from the consensus block;

program instructions to detect, in the consensus block, a vehicle motion pattern, wherein the vehicle motion pattern deviates from a threshold by greater than a tolerance;

program instructions to map the vehicle motion pattern to a particular vehicle in the set of vehicles; and program instructions to generate a feedback response based on the mapping.

13. The computer program product of claim 12, further comprising:

program instructions to update the consensus block with data from non-vehicular sensors.

14. The computer program product of claim 12, wherein the consensus block is stored as immutable data in a blockchain database.

15. The computer program product of claim 12, wherein the feedback response comprises commanding the mapped vehicle to perform an action.

16. The computer program product of claim 12, wherein computer usable code is stored in a computer readable storage device in a data processing system, and wherein the computer usable code is transferred over a network from a remote data processing system.

17. The computer program product of claim 12, wherein computer usable code is stored in a computer readable storage device in a server data processing system, and wherein the computer usable code is downloaded over a network to a remote data processing system for use in a computer readable storage device associated with the remote data processing system.

18. A computer system, comprising:

a processor;

a computer-readable memory;

a computer-readable storage device; and program instructions stored on the storage device for execution by the processor via the memory, the stored program instructions comprising:

program instructions to collect vehicle sensor data from a set of vehicles operating in a traffic environment, wherein each vehicle transmits vehicle sensor data via a communications network to a processor;

program instructions to determine whether to analyze the vehicle sensor data by determining whether the set of vehicles includes enough vehicles to form a quorum;

program instructions to form, responsive to determining that the set of vehicles forms a quorum, a consensus block of aggregate data, wherein the aggregate data comprises individual vehicle sensor data from each vehicle in the set of vehicles, and wherein the processor discards duplicate data and repetitive data from the consensus block;

program instructions to detect, in the consensus block, a vehicle motion pattern, wherein the vehicle motion pattern deviates from a threshold by greater than a tolerance;

program instructions to map the vehicle motion pattern to a particular vehicle in the set of vehicles; and program instructions to generate a feedback response based on the mapping.

19. The computer system of claim 18, further comprising program instructions to update the consensus block with data from non-vehicular sensors.

20. The computer system of claim 18, wherein the response comprises commanding the mapped vehicle to perform an action.

* * * * *